US007744469B2

(12) United States Patent
Shimosato et al.

(10) Patent No.: US 7,744,469 B2
(45) Date of Patent: Jun. 29, 2010

(54) COMPUTER-USABLE PROGRAM, STORAGE MEDIUM AND GAME APPARATUS

(75) Inventors: Yoichi Shimosato, Tokyo (JP); Naoyuki Ukeda, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 394 days.

(21) Appl. No.: 11/364,894

(22) Filed: Feb. 27, 2006

(65) Prior Publication Data

US 2006/0205460 A1  Sep. 14, 2006

(30) Foreign Application Priority Data

Feb. 28, 2005  (JP)  ............................. 2005-053892

(51) Int. Cl.
*A63F 9/24* (2006.01)
*A63F 13/00* (2006.01)
*G06F 17/00* (2006.01)
*G06F 19/00* (2006.01)

(52) U.S. Cl. ................... 463/43; 463/5; 463/6; 463/31; 463/42; 273/255; 273/261; 709/227

(58) Field of Classification Search ................ 273/292; 463/1, 7–9, 42, 32, 43
See application file for complete search history.

(56) References Cited

U.S. PATENT DOCUMENTS

| | | | | | |
|---|---|---|---|---|---|
| 4,657,247 | A | * | 4/1987 | Okada | 463/23 |
| 5,570,887 | A | * | 11/1996 | Christie, Jr. | 273/261 |
| 5,580,308 | A | * | 12/1996 | Nakamura | 463/7 |
| 5,662,332 | A | * | 9/1997 | Garfield | 273/308 |
| 6,146,269 | A | * | 11/2000 | Morihira | 463/8 |
| 6,159,100 | A | * | 12/2000 | Smith | 463/42 |
| 6,162,120 | A | * | 12/2000 | Takahashi et al. | 463/8 |
| 6,270,416 | B1 | * | 8/2001 | Komoto | 463/43 |
| 6,273,814 | B1 | * | 8/2001 | Komoto | 463/7 |
| 6,340,330 | B1 | * | 1/2002 | Oishi et al. | 463/8 |
| 6,425,827 | B1 | * | 7/2002 | Nimura | 463/35 |
| 6,585,599 | B1 | * | 7/2003 | Horigami et al. | 463/43 |
| 6,729,960 | B1 | * | 5/2004 | Matsuno | 463/30 |

(Continued)

OTHER PUBLICATIONS

Ross, S. John. "Unlimited Mana: An Alternative Approach to GURPS Magic." Jan. 1999. Steve Jackson Games. Second Revised Version (v3.0). Perinent pp. 2, 3 and 7.*

(Continued)

*Primary Examiner*—John M. Hotaling, II
*Assistant Examiner*—Paul A. D'Agostino
(74) *Attorney, Agent, or Firm*—Ladas & Parry, LLP (57) ABSTRACT

In a computer program product which makes a computer operate as a game apparatus, the computer is operated by a "load value determining means" that, when a "remaining quantity" of an energy value representing the quantity of energy owned by the character is less than a "variable value" set as the energy consumed as an equivalent value for using a skill at the time that an operation for instructing the performance of the skill set for the character is proceeded, performs the skill, and determines a load value based on a difference between the remaining quantity of the energy value and the variable value; and a "restriction processing means" that places a restriction according to the load value on a parameter relating to an ability of the character during the time that the energy value is restored up to a predetermined basic value.

10 Claims, 8 Drawing Sheets

U.S. PATENT DOCUMENTS

| | | | |
|---|---|---|---|
| 6,918,833 B2 * | 7/2005 | Emmerson et al. | 463/23 |
| 7,309,288 B2 * | 12/2007 | Machida | 463/43 |
| 2002/0169013 A1 * | 11/2002 | Serizawa et al. | 463/6 |
| 2003/0092492 A1 * | 5/2003 | Ishii et al. | 463/42 |
| 2003/0094759 A1 * | 5/2003 | Niedner et al. | 273/255 |
| 2003/0207712 A1 * | 11/2003 | Sterchi et al. | 463/23 |
| 2004/0038739 A1 * | 2/2004 | Wanat | 463/36 |
| 2004/0204212 A1 * | 10/2004 | Sato | 463/5 |
| 2004/0219976 A1 * | 11/2004 | Campbell | 463/31 |
| 2004/0254004 A1 * | 12/2004 | Kojima et al. | 463/1 |
| 2004/0259617 A1 * | 12/2004 | Machida | 463/5 |
| 2005/0193120 A1 * | 9/2005 | Taylor | 709/227 |
| 2007/0015588 A1 * | 1/2007 | Matsumoto et al. | 463/43 |

OTHER PUBLICATIONS

"Neverwinter Nights Instruction Manual." 2002. BioWare Corp. Infrogames Entertainment. Pertinent pp. 3, 8, and 9.*

* cited by examiner

COMPUTER-USABLE PROGRAM, STORAGE MEDIUM AND GAME APPARATUS

BACKGROUND OF THE INVENTION

1. Field of the Invention

The present invention relates to a game program that makes a computer operate as a game executing means. The invention particularly relates to the game program in a game apparatus in which a character with a special ability having a specified effect on an object is made to come out in a game space instead of consuming an energy exclusive for a virtual skill at the time of performing the skill so that a game is conducted, a storage medium, and the game apparatus.

2. Description of the Related Art

In game apparatuses having functions for conducting computer games such as so-called action games and role playing games, motions of leading characters and associate characters (player characters) in game images displayed on screens of display devices are controlled according to operation signals from input devices (controller pads) operated by players, so that stories of the games move ahead.

For example, in games where player characters grow up, ability values which are obtained by digitizing levels of various abilities such as offensive power, physical strength, magic power, defensive power, legerity and intellectual capability, and level values which represent growing-up levels of the player characters are set as parameters. When the player characters obtain predetermined experience quantity during the progress of the games, the level values of the player characters are increased, and the ability values are suitably updated according to operations selected by the players or predetermined algorithms, so that the corresponding abilities are improved.

There are many kinds of skills performed in response to operations of players, including basic skills such as offensive skills for attacking opponent characters using weapons, etc., so as to damage the opponent characters and defensive skills, special skills performed in sports games such as various ball games and snow surfing, special skills performed by vehicles themselves, special skills such as magic skills and knockout skills bringing on specified effects on objects, and the like.

In these skills, there are basic abilities consuming the energy at the time of performing skills, and special abilities consuming the specified energy for performing skills (hereinafter referred as "special abilities"). So-called magic skills and knockout skills are included in the energy consuming "special abilities". An energy value (point value) representing the quantity of energy owned by a character is, for instance, expressed by MP (magic point) in the case of magic and by AP (action point) in the case of the knockout skill. Namely, these values MP and AP are set as special parameters to each character according to each system of the special abilities. A maximum value of the energy value (hereinafter referred as "EP") owned by a character is increased according to a rise in the level of the character or when the character is equipped with special clothing accessories. The above EP is supplied when the character gets rest in an inn, in a special place, or by using restoring magic, or EP is restored naturally according to the passing of time.

The energy consumption (the amount of the energy consumed as an equivalent value for using a skill) of a special ability is predetermined according to the type of skills, and when the remaining quantity of the EP is less than the energy consumption of the skill desired to use, it is normal that the skill cannot be used.

Figure 1:
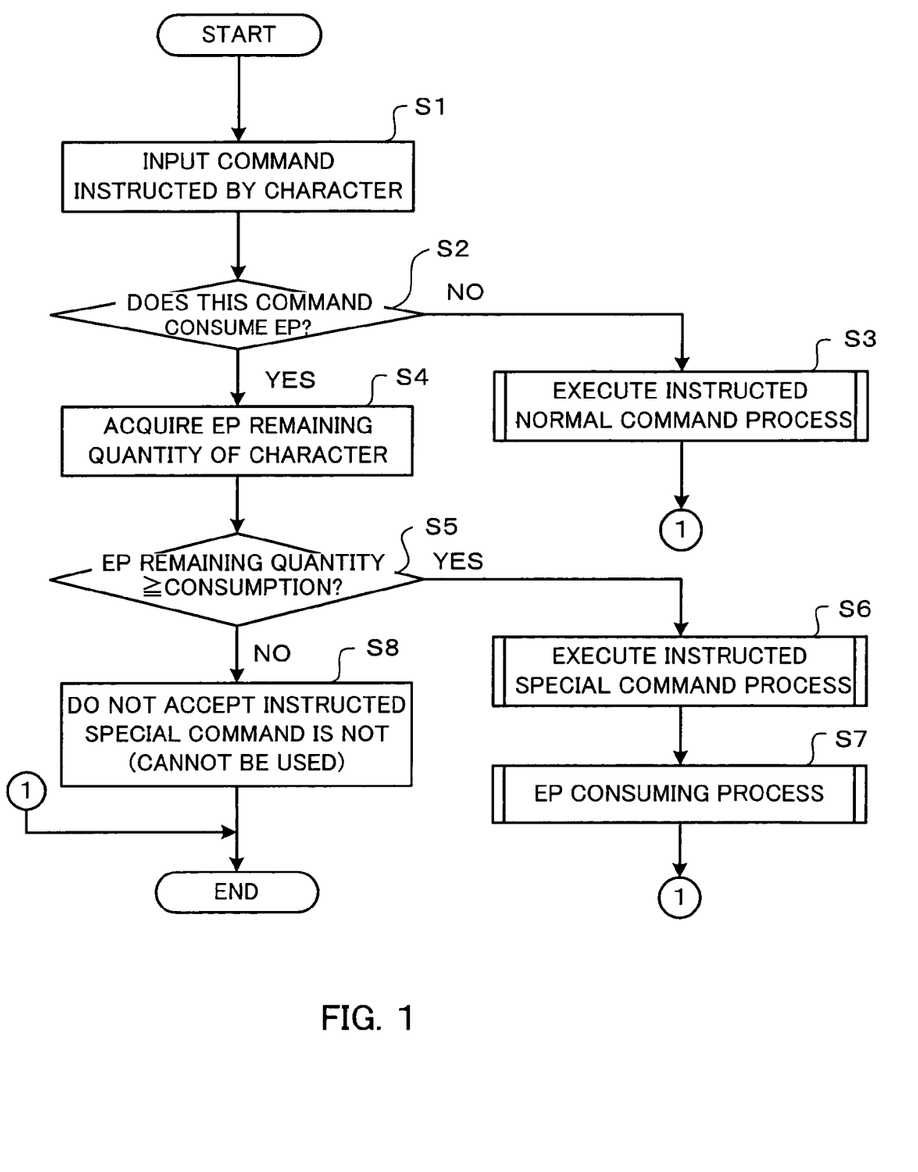
FIG. 1 is a flowchart illustrating a process relating to special abilities in a conventional game apparatus.

A process relating to the special abilities in a conventional game apparatus is explained according to a flowchart of FIG. 1.

A command processing section of the game apparatus displays a menu of various commands on a monitor so as to prompt a player to input a command. When a command is selected by an operation of an operation button or the like (step S1), the command processing section determines whether the command instructed to a player character is a command of a special ability which consumes EP (hereinafter, "special command") (step S2). When it is not the special command, the command processing section executes a process corresponding to the instructed normal command (step S3), and when it is the special command, the command processing section acquires a parameter value representing the remaining quantity of EP of the player character (step S4). The command processing section determines whether the EP remaining quantity is not less than the energy consumption (energy necessary for the special ability desired to be used) (step S5). When the EP remaining quantity is not less than the energy consumption, the command processing section executes a process corresponding to the instructed special command (step S6), subtracts the EP consumption from the EP remaining quantity (step S7), and ends the command process. On the other hand, when the EP remaining quantity is insufficient at step S5, the command processing section does not accept the special command (step S8), and ends the command process.

In the conventional game apparatus, in the case where the special ability which consumes the energy (EP) is used, if the energy remaining quantity is smaller than the necessary energy of the special ability desired to be used by the player, such a special ability cannot be used.

The processing method relating to the special abilities shown in the flowchart of FIG. 1 is a publicly-known processing method which can be derived from operation manuals or walk-through manuals of role playing games or the like. Since, however, the applicants of this application do not know technical documents which concretely disclose the above processing method at the time of the application, documents relating to prior arts which should be disclosed are not present.

The conventional computer games such as role playing games adopt a system where exclusive parameter values, such as the "MP" parameter in the case where the special ability of a character is magic and the "AP" parameter in the case where it is the knockout skill, are consumed and used. For example, in the case of magic, the MP consumption is 1 point in the case of magic M1, and is 3 points in the case of magic M2. Namely, the consumption is determined according to types of the skills, and when the MP remaining quantity is smaller than the necessary MP of the magic desired to be used, the magic cannot be used normally.

In recent years in which the techniques and hardware of image processing of three-dimensional computer graphics or the like are being developed, not only simulation type games but also action games and role playing games adopt simulation elements lavishly, so that, for example, motions and backgrounds of objects are simulated more real, thereby displaying a sense of realism.

Although image expression develops securely, most contents of games get into a rut and do not have novel idea because a long time has passed since computer games were realized. For this reason, in any computer games, their game lines tend to be similar, and as to the processing method of special abilities as one example, the offensive pattern or the like is monotonous because common-sense restrictions are provided. As a result, a lot of the computer games are boring.

SUMMARY OF THE INVENTION

The present invention is the devised one in view of the above circumstances, and it is an object of the present invention to provide a game program that can develop a game in a novel and non-conventional way without being constrained by common-sense restrictions depending on the physical law, and enables a character to use a special ability under special conditions even when the energy is insufficient, a storage medium, and a game apparatus.

The present invention relates to a game program, a storage medium and a game apparatus. In respect to the game program, object of the present invention is achieved by a computer-usable program for controlling a game, the program comprising a processing routine for executing: a skill performance judging means that judges whether the skill performance set for a character was instructed based on an operation signal inputted from an operation means, and when the judgment is made in the affirmative, compares a remaining quantity of energy value at the time of inputting the operation representing a quantity of energy owned by said character with a variable value set as a quantity of energy consumed as an equivalent value for using the skill so as to determine whether the skill can be performed; a skill performance processing means that, when said skill can be performed, performs said skill and varies said energy value based on said variable value; an energy restoration processing means that judges whether the energy value fluctuates from a predetermined value of criterion due to the use of said skill, and when the energy value fluctuates, restores the varied amount of the energy value up to the value of criterion based on an operation signal for instructing the restoration of energy inputted from the operation means or a predetermined parameter fluctuation according to the process of game; a load value determining means that, when said remaining quantity of energy value is less than said variable value at the time that an operation for instructing said skill performance is proceeded, performs said skill, and determines the load value based on a difference between said remaining quantity of energy value and said variable value; and a restriction processing means that places a restriction corresponding to said load value on a parameter relating to an ability of said character during the time that said energy value is restored up to a predetermined basic value.

Further, the object of the present invention is achieved more effectively by the energy restoration processing means that counts the progress time of said game and proceeds to restore said varied amount of the energy value up to said value of criterion by each predetermined restoration value gradually at each predetermined elapsed time based on said counted progress time, and the restriction processing means that adds a restriction against said energy restoration processing means corresponding to the amount of said load value on at least one of said elapsed time or said restoration value during the time that said load value is restored up to said basic value. Further, the object of the present invention is achieved by a computer-usable program for controlling a game for making a computer operate as a selection input processing means that, when said skill performance judging means judges that said remaining quantity of energy value is less than said variable value at the time that an operation for instructing said skill performance is proceeded, displays options to use or not use said skill or to select or not select another skill on a display means in order to make a player select an option, and determines whether said skill is performed based on the option selected by the player's input, and as an energy value display processing means, when said restriction processing means does not execute the restriction in the process of game, displays said energy value and said remaining quantity of energy value on the display means, and when said restriction processing means executes the restriction, displays said load value instead of said remaining quantity of energy value on the display means based on said load value, said restoration value and said remaining quantity of energy value, so as to display the state that said energy value is restored up to said value of criterion with the state being visible by a player.

The object of the present invention is achieved by the storage medium that stores one of the above computer-usable programs for controlling a game therein.

Further, the object of the present invention is achieved by the game apparatus that includes: a skill performance judging means that judges whether the skill performance set for a character was instructed based on an operation signal inputted from an operation means, and when the judgment is made in the affirmative, compares a remaining quantity of energy value at the time of inputting the operation representing a quantity of energy owned by said character with a variable value set as a quantity of energy consumed as an equivalent value for using the skill so as to determine whether the skill can be performed; skill performance processing means that, when said skill can be performed, performs said skill and varies said energy value based on said variable value; an energy restoration processing means that judges whether the energy value fluctuates from a predetermined value of criterion due to the use of said skill, and when the energy value fluctuates, restores the varied amount of the energy value up to the value of criterion based on an operation signal for instructing the restoration of energy inputted from the operation means or a predetermined parameter fluctuation according to the process of game; a load value determining means that, when said remaining quantity of energy value is less than said variable value at the time that an operation for instructing said skill performance is proceeded, performs said skill, and determines the load value based on a difference between said remaining quantity of energy value and said variable value; and a restriction processing means that places a restriction corresponding to said load value on a parameter relating to an ability of said character during the time that said energy value is restored up to a predetermined basic value.

According to the present invention, even in the case that the energy value is insufficient when a character performs a skill, namely, even in the case that the remaining quantity of the energy value of the character at that time is less than the variable value consumed as an equivalent value for using the skill, the skill performance is permitted. As a result, in the case that special abilities cannot be used due to insufficient energy on an important scene in the conventional cases, such as that a character succumb in a competition by a narrow margin, the character cannot strike a final fatal blow at an opponent character, and the character cannot participate in a battle due to a damage, the special abilities can be effectively displayed. Further, although the performance of the skill is permitted, in compensation of the above, a restriction according to the load value determined based on the difference between the remaining quantity and the variable value of the energy value is placed on a parameter relating to an ability of the character. As a result, more interesting game requiring more thinking power of a player can be provided wherein the player plays the game by thinking various things such that the player uses the skill at a risk of receiving disadvantages, waits until the energy restored sufficiently, or uses another method without using the skill, etc.

DESCRIPTION OF PREFERRED EMBODIMENTS

Embodiments of the present invention are explained in detail hereinafter with reference to the drawings. The explanation exemplifies computer games such that a predetermined display object (hereinafter, player character) which moves in response to an input operation of an operator (hereinafter referred as a player) is made to come out in a game space and the game is conducted.

Figure 2:
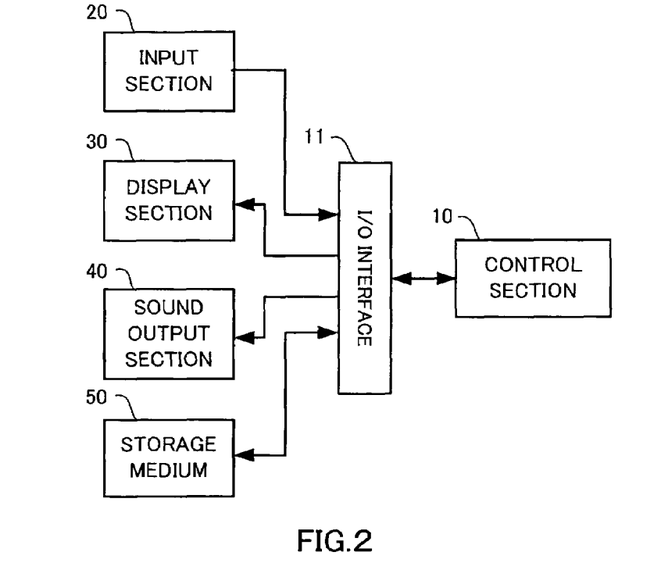
FIG. 2 is a block diagram illustrating one example of a constitution of an information processing apparatus that realizes the present invention.

An apparatus to which a game program of the present invention is applied may be an information processing apparatus such as a home video game machine, a personal computer, a mobile telephone or an arcade video game machine which can execute a computer program. Such an apparatus can adopt a general-purpose hardware organization. FIG. 2 is a block diagram illustrating one example of a constitution of an information processing apparatus (hereinafter referred as a game apparatus) which realizes the present invention. The game apparatus according to the present invention has a control section 10, an input section 20, a display section 30, a sound output section 40 and a storage medium 50. The control section controls execution of computer programs and output/input with respect to peripheral devices via an I/O interface 11. The input section 20 inputs operation information or the like of a player. The display section 30 displays images. The sound output section 40 outputs sound effects, sounds and the like. The storage medium 50 stores application programs and data therein. In a hardware constitution, the control section 10 is composed of a control apparatus such as CPU and MPU, the input section 20 is composed of an input device such as a control pad, a joy stick and a keyboard, the display section 30 is composed of a display device such as a liquid crystal display and CRT, and the voice output section 40 is composed of a sound output device such as a speaker. The present invention is not restricted according to these types and numbers of the hardware.

The storage medium 50 is an information storage medium wherein a game program and data of the present invention are stored, and the type and presence position of the medium are not restricted as long as that the input and output of the medium can be controlled by CPU. For example, the constitution may be such that a program stored in the storage medium of a server on a network and a program on the side of the game apparatus execute a process relating to computer graphics in cooperation with each other. The constitution may be such that a program is read from a predetermined storage medium on the game device side (storage medium such as flexible disc, hard disc, CD-ROM, CD-R, DVD-ROM, DVD-RAM, DVD-R, PD disc, MD disc or MO disc) and executes the process independently on the game apparatus side. The latter example is explained hereinafter.

A game apparatus, which makes character having a "special ability" described in the background art come out in a game space and conducts a computer game, is explained hereinafter as an example.

Figure 3:
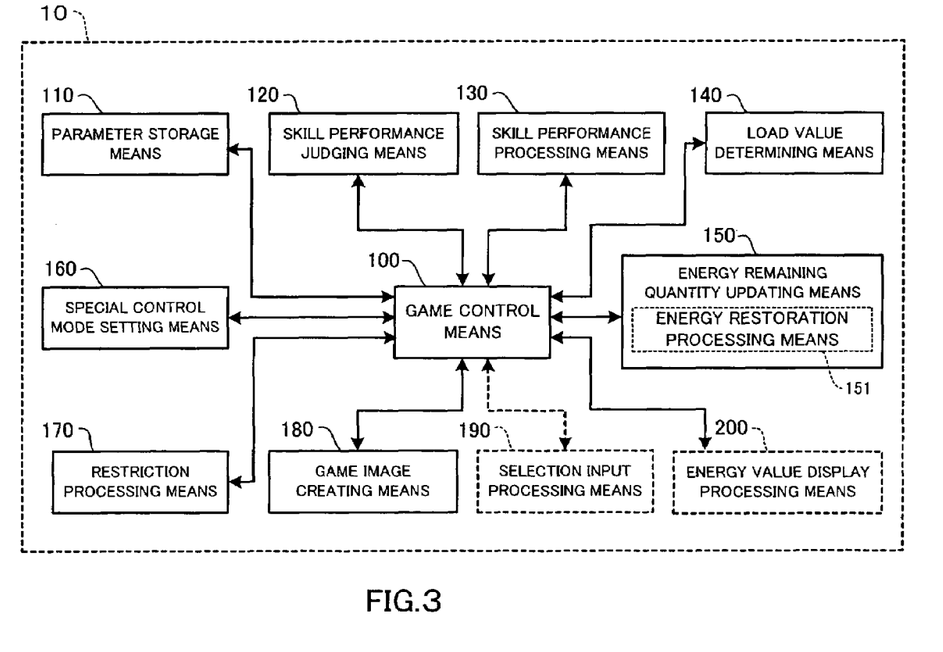
FIG. 3 is a block diagram schematically illustrating a constitutional example of a main section in the game apparatus according to the present invention.

FIG. 3 is a block diagram schematically illustrating a constitutional example of a main section in the game device according to the present invention. The game program, which makes the computer operate as respective means relating to a game, has means other than the respective means (functions) in the control section 10 shown in FIG. 3. FIG. 3, however, illustrates only main means of the present invention as a functional block diagram, and the illustration and the explanation of the means other than the main means are omitted. The names of the respective means are used for convenience of the explanation, and thus the names and dividing form of the functional block are not restricted in the present invention.

The game apparatus of the present invention is, as shown in FIG. 3, for example, composed of a game control means 100, a parameter storage means 110, a skill performance judging means 120, a skill performance processing means 130, a load value determining means 140, an energy remaining quantity updating means 150, a special control mode setting means 160, a restriction processing means 170, a game image creating means 180, a selection input processing means 190 and an energy value display processing means 200. These means are realized by programs in this embodiment.

The game control means 100 is a means that controls execution of a game, and controls the conducting of the game and the respective means 110 to 200 based on the operation information of the player from the input section 20 and control information of the game read from the storage medium 50. The parameter storage means 110 is a means that stores various parameters relating to the control of a character therein. The parameter storage means 110 creates a database where parameters, which represent the current energy remaining quantity of an energy owned by the character (the remaining quantity of the energy value representing the quantity of the energy owned by the character) and the consumption of an energy consumed at the time of performing a special ability (a variable value set as the quantity of the energy consumed as a counter value for using the skill), are related with respective characters. Information about parameters is stored in the storage medium. The "special ability" in the present invention means a special ability (skill) which consumes the specified energy for a skill, such as a magic skill and a knockout skill set for the character as explained in the background art, namely, means an ability (hereinafter referred as a "skill") which has a specified effect on an object when the ability is used.

The skill performance judging means 120 is a means that judges whether a commanded skill can be performed, and it judges whether an operation for commanding the a skill performance set for a character is performed based on an operation signal inputted from the operation means as a component of the input section 20. When the skill performance judging means 120 judges that the operation is performed, it compares the EP energy remaining quantity with the energy consumption at the time of the inputting operation, so as to judge whether the commanded skill can be performed.

"EP" in the present invention is similar to EP defined in the background art, and means an energy value representing the quantity of the energy owned by a character, such as MP (magic point) and AP (action point). Further, the "energy remaining quantity" means the EP remaining value. A value which is set as the quantity of energy consumed as an equivalent value for using a skill is, hereinafter, called as "variable value" or "energy consumption".

The skill performance processing means 130 is a means that accepts a performing command for a virtual skill owned by a character so as to execute the corresponding process. When the skill performance judging means 120 judges that the skill can be performed, the skill performance processing means 130 performs the skill, and varies the EP value based on the variable value corresponding to the skill.

In the conventional game apparatuses, only when a judgment is made that current EP is not less than the energy consumption, namely, only when EP is not insufficient, the commanded skill can be performed. In the present invention, however, also when EP is insufficient, the skill can be performed, and a specified restriction is placed on the abilities or the like of a character on the other hand.

The load value determining means 140 and the restriction processing means 170 are means that execute a restriction placing process. When EP is lower than the variable value at the time when the skill performing command is executed, for example, EP>0, the load value determining means 140 performs the commanded skill, and determines a load value based on a difference between EP and the variable value. "The load value" is a variable which is used when a restriction is placed on the abilities or the like of a character. The restriction processing means 170, as mentioned hereinafter, executes a restriction process such that a restriction according to the load value is placed on the parameters relating to the abilities of the character (characteristics, motion, action and the like) until the energy value is restored up to a predetermined basic value based on the load value determined by the load value determining means 140. This restriction process may be executed by the skill performance processing means 130, but this process is executed by the restriction processing means (another module) 170 hereinafter.

The energy remaining quantity updating means 150 is a means that subtract the energy consumption from the energy remaining quantity of a character at the time of performing a skill and updates the energy remaining quantity of the character stored in the parameter storage means 110. In the conventional game apparatuses, the subtracted result does not obtain a minus value, but in this embodiment, when the skill performing processing means 130 permits the skill performing command as a special case, the energy remaining quantity is updated by using the result obtained by subtracting the energy consumption from the energy remaining quantity as a negative energy. The subtracted result (−α) is not used as the energy remaining quantity, but for example, the minus energy may be varied according to a current value of the basic abilities of a character at this time, such as offensive power and physical strength. The state that a character has the minus energy is called as "overheat state" for convenience of the explanation.

An energy restoration processing means 151 as a component of the energy remaining quantity updating means 150 is a means that restores a variation of EP to a predetermined value of criterion (in this embodiment, the maximum value of EP). In this embodiment, in progress of a game, a determination is suitably made whether EP of a character fluctuates from the predetermined value of criterion due to use of a skill, and when the EP fluctuates, the fluctuation of EP is restored up to the value of criterion based on an operation signal for commanding the energy restore inputted from the operation means (or a predetermined parameter change due to the process of game). For example, when the varied amount of EP is restored automatically according to the passing of time, the energy restoration processing means 151 counts progress time of a game, and restores the varied amount of EP up to the predetermined value of criterion by each predetermined restoration value at each predetermined elapsed time based on the counted time.

In the game of the present invention, EP owned by a character is premised as that is restored naturally according to the passing of time. For example, although it is possible that EP can be restored by using an item (item for restoring EP) acquired during the game, if EP which obtains a minus value can be easily restored, a risk in the overheat state (in this embodiment, while that EP is minus) is eliminated almost completely. For this reason, the number and the price of the restoring items are restricted so that the restoration of EP is controlled mainly according to time.

The special control mode setting means 160 is a means that sets a control mode of a character in the game as a special control mode while the character is in the overheat state. For example, when the remaining quantity of the energy owned by the character transits from a plus energy to a minus energy, the means 160 sets the control mode of the character as the special control mode, and when the energy remaining quantity transits from a minus energy to a plus energy, it cancels the special control mode. The special control mode is set correspondingly to a character.

"Character" in the present invention includes various characters which can perform skills, such as "player character", "associate character" which teams up with the player character, "opponent character" which is opposed to or is a competitor of the player character or the associate character, and "vehicle character" representing various vehicles such as carrier, airframe, submarine object, robot and animal. The overheat state is preferably generated only for a character which can be operated by a player so that the player enjoys an advantage, but it may be generated for a character which cannot be operated by the player or only for a specified character.

The restriction processing means 170 is a means that places a restriction according to the load value determined by the load value determining means 140 on the parameters relating to the abilities of the character during the time that the energy value is restored up to a predetermined basic value. As the restriction process, for example, a specified phenomenon which brings disadvantages to a character in progress of the game takes place. The specified phenomenon which is produced by the restriction processing means 170 is preferably a phenomenon which brings a minus influence to the player in such a manner that a restriction is placed on at least any one of the ability (characteristic), motion and action of the character as, for example, various basic ability value, characteristic of motion, (motion amount, speed and the like) and an action range (the phenomenon which brings disadvantages in progress in the game). These phenomena are produced consecutively or temporarily according to the progress condition of the game while the special control mode is set (in this embodiment, the character has a minus energy).

For example, the restriction processing means 170 places a restriction on at least any one of "elapsed time" and "restoration value per time" as elements for restoring EP while the character is in the overheat state (in this embodiment, EP is restored from the load value "minus energy value" to the predetermined basic value "plus energy value"). As a result, the means 170 controls the energy restoration processing means 151 so that the restore time of the energy value is delayed from the time of normal process. For example, in the case where it normally takes 10 seconds that EP restores to 10, the restore time is restricted so that it takes 20 seconds that EP restores from −10 to 0 (basic value) in the overheat state.

When the restriction process is executed by performing a skill, it is preferable that the level of the restriction for the EP restore is changed based on the variable value corresponding to EP (energy consumption). For example, in the state that the energy value (MP) of a magic skill is 0, the magic skill with energy consumption (variable value) of 10 is used, MP becomes −10, and when a magic skill with variable value of 20 is used, MP becomes −20. In this case, it takes 20 seconds that MP restores from −10 to 0, but it does not take 40 seconds which is two times the former case that MP restores from −20 to 0, and it takes more time (for example, 40 seconds plus 10 seconds). In such a manner, the level of the restriction for restore of EP is changed based on the variable value.

When at least one of the parameter values which represent elements of basic abilities such as offensive power, physical strength, magic power, offensive power, athletic ability and intellectual ability is set to be smaller than a normal value, the phenomenon such that the ability of the character is worsened or cannot be used may be produced. The ability of the opponent character may be improved without worsening the ability of the character. The level of a minus influence on the character may be constant, but it may be changed according to the variable value corresponding to EP or according to the value and difficulty level of the basic abilities.

The number of the phenomena to be produced by the restriction processing means 170 is not restricted to one, and a plurality of phenomena may be produced simultaneously or intermittently. Different phenomena may be produced according to the progress condition and scene of the game. In this embodiment, examples of the special abilities (skills) owned by the character are abilities such as a magic skill and a knockout skill which have specified effects on an object, but they may be the special skills which consume dedicated energy. For example, these skills may include, for example, abilities of vehicles (durability, temporary power and the like) and abilities of Kyudo (Japanese art of archery) and ball games (direct hitting ability, ability relating to flying distance and the like).

The game image creating means 180 is a means that creates and displays a game image on a monitor or the like of the game apparatus. The means 180 creates main image data such as background, play character and the like, and synthesizes the main image data with sub-image data (effect image data representing showing effect such as rain and fog, map image data representing the position of the character in the game space and the like) as the need arises, so as to output the image data to the display section 30.

The selection input processing means 190 and the energy value display processing means 200 are additive components. In this embodiment, even if EP is insufficient at the time of performing a kill, the skill is automatically performed, but the player may select to activate the skill or not to activate the skill. In that embodiment, the selection input processing means 190 is provided. For example, when the skill performance judging means 120 judges that the EP remaining quantity is less than the variable value at the time when the operation for commanding the performance of the skill is executed, the selection input processing means 190 displays options to use, not to use the skill and to select another skill on the display means which are selected by the player, so as to determine whether the skill is performed based on the selected option selected by the player's input.

The energy value display processing means 200 is a means that displays the state of the energy owned by the character. For example, when the restriction processing means 170 does not execute the restriction process in progress of the game, the energy value display processing means 200 displays the maximum quantity and the remaining quantity of EP on the display means. When the restriction processing means 170 executes the restriction process, the means 200 displays the load value instead of the EP remaining quantity based on the load value, the restoration value and the remaining value of EP, so as to display the state that EP restores to the value of criterion (in this embodiment, the value of criterion representing the maximum quantity of EP owned by the character) with the state being visible by the player. The concrete example of the display format is mentioned later with reference to FIG. 9.

The processes executed by the means, respectively, such as the skill performing process by the skill performance processing means 130, the energy restore process by the energy restoration processing means 151 and the restriction process by the restriction processing means 170 are realized by computer programs (hereinafter, programs) to be executed by CPU. The programs are stored in the predetermined storage medium 50 on the game apparatus side. The present invention includes a form such that some functions are realized by hardware.

An operational example of the game apparatus of the present invention, in the above constitution is explained.

Figure 4:
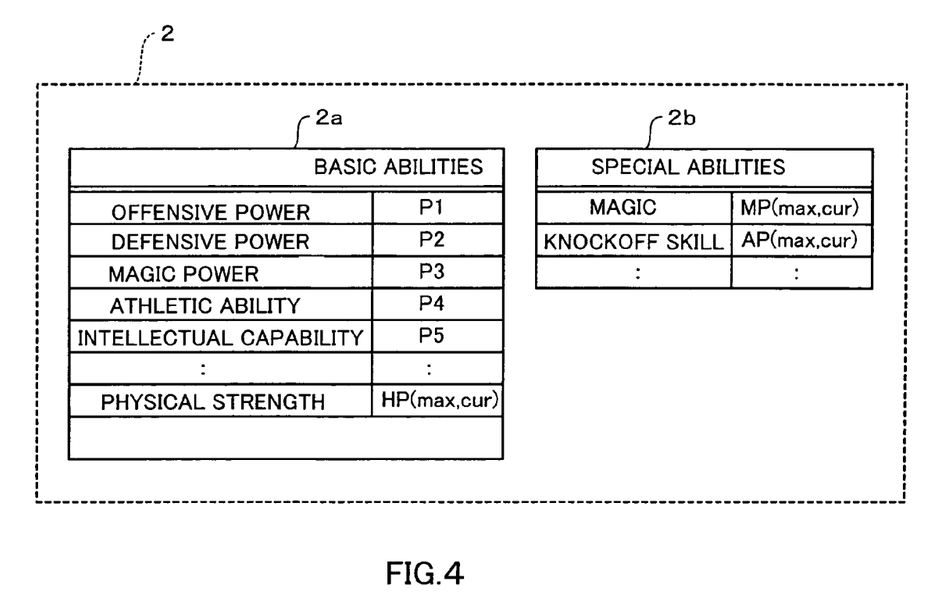
FIG. 4 is a pattern diagram illustrating one example of a constitution of a character information table according to the present invention.

A character information table of the present invention is explained below. For example, in the case of an action type role playing game, as shown in FIG. 4, various parameters relating to control of abilities, motions and actions of characters are set for each character in the character information table 2. The parameters include a basic ability parameter 2*a* where information about the basic abilities are stored, and a special ability parameter 2*b* where information about the skills as the special abilities are stored. Examples of another information to be stored in the character information table are a level value representing a growing level of a character, statuses showing various states of the character such as a battle inability state and a confusing state, item information showing various items (weapons, protective equipment, restore items and the like) owned by the character, position information about the character, and a special status showing "overheat state" (information about the special control mode).

The "basic abilities" of the present invention are, as shown in FIG. 4, abilities (competence which is not consumed) such as the offensive power, the defensive power, the magic power, the athletic ability (legerity, instantaneous force, jumping power, stamina and the like), and intellectual ability, and basic abilities such as physical strength which is consumed at the time when the character is damaged. The respective elements of the basic abilities are digitized, and are set as basic ability parameters P1 to P5, and HP (maximum value, current value).

On the other hand, the "special abilities (skills)" of the present invention are special abilities (skills) which consume energies dedicated for the skills, and the abilities which have specified effects on objects due to use of the abilities. For example, as shown in FIG. 4, the special abilities have special skills which damage opponent character, associate character and objects such as special matters or have specified effects such as strengthening of offensive power and defensive power, restore of physical strength and functions as keys on the objects instead of consuming energies specified for the virtual magic skill and knockout skill (energies represented by magic point, timing gauge and the like). The respective elements of these special abilities are digitized, and are set as, for example, the special ability parameters MP (maximum value, current value), and AP (maximum value, current value). MP (magic point) and AP (action point) are generally called as "EP" for convenience of explanation similarly to the definition in the background art. In the example of FIG. 4, "max" of EP (max, cur) shows the maximum quantity of the energy owned by the character, and "cur" shows a current energy remaining quantity (EP remaining quantity). As another information relating to the special abilities, the quantity of effect on the object due to the special abilities and the consumption of the energy consumed at the time of using the special abilities are set for each type of the systematized skills of the special abilities such as the magic skill and the knockout skill, and are stored in the character information table or another control table.

Figure 5:
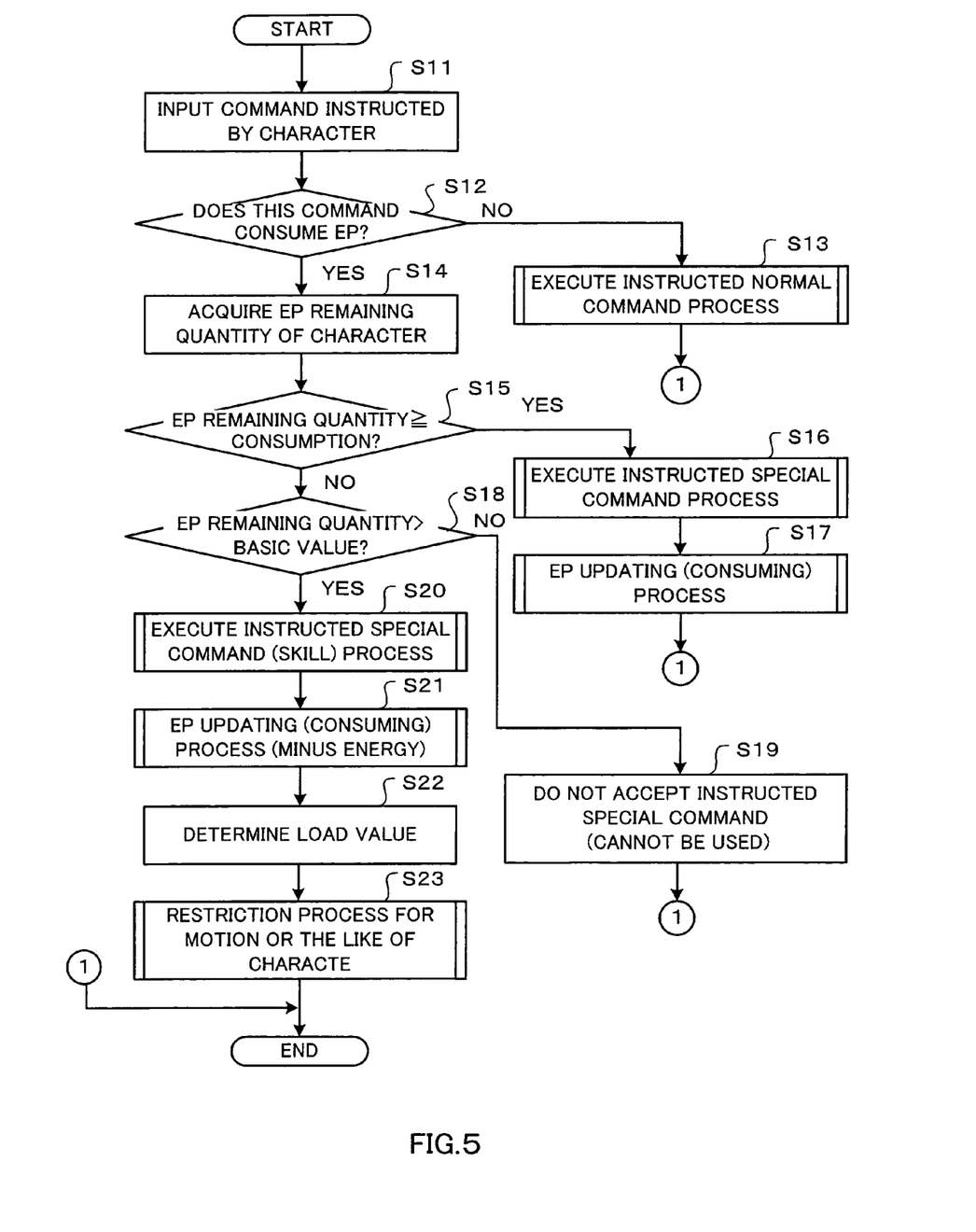
FIG. 5 is a first flowchart illustrating a process relating to special abilities according to the present invention.
Figure 6:
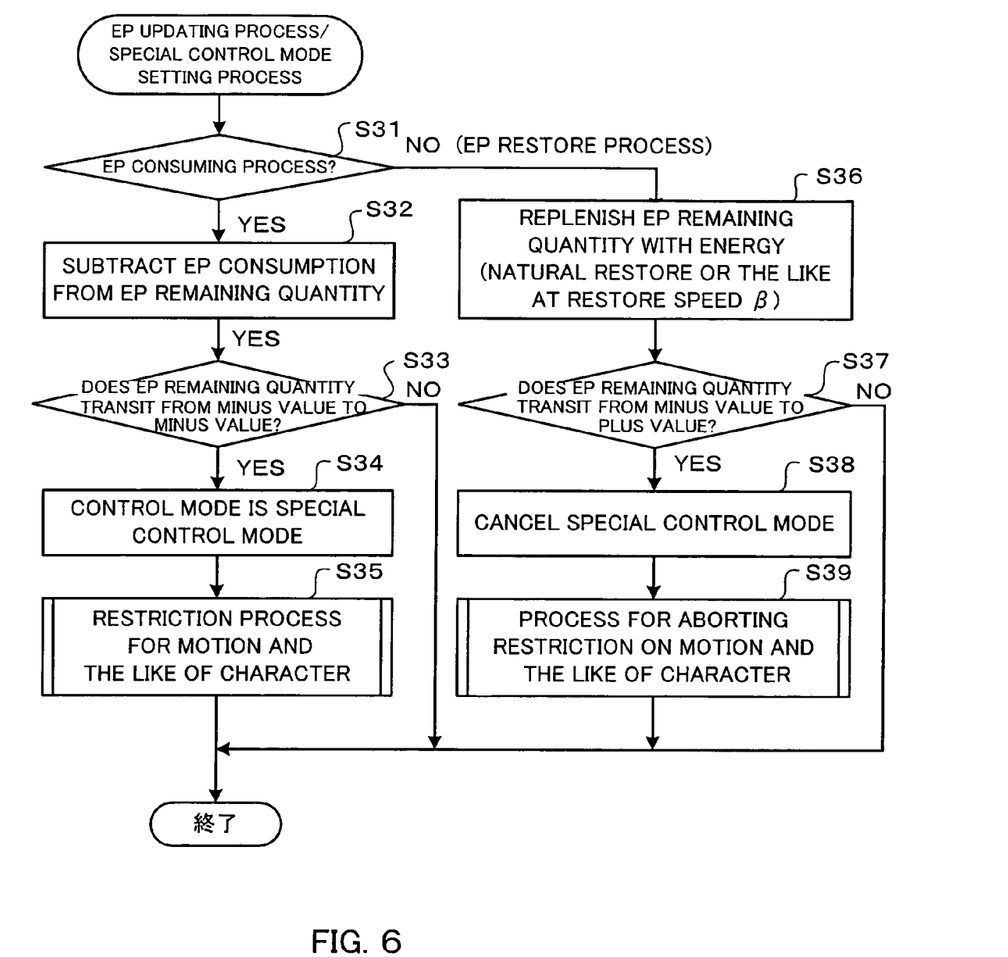
FIG. 6 is a second flowchart illustrating a process relating to special abilities according to the present invention.

The process relating to the special abilities in the present invention is explained with reference to the flowcharts of FIGS. 5 to 7. The explanation refers to the case where a command for the player character is input, but the same process is applied also to the case of characters other than the player character.

Figure 8:
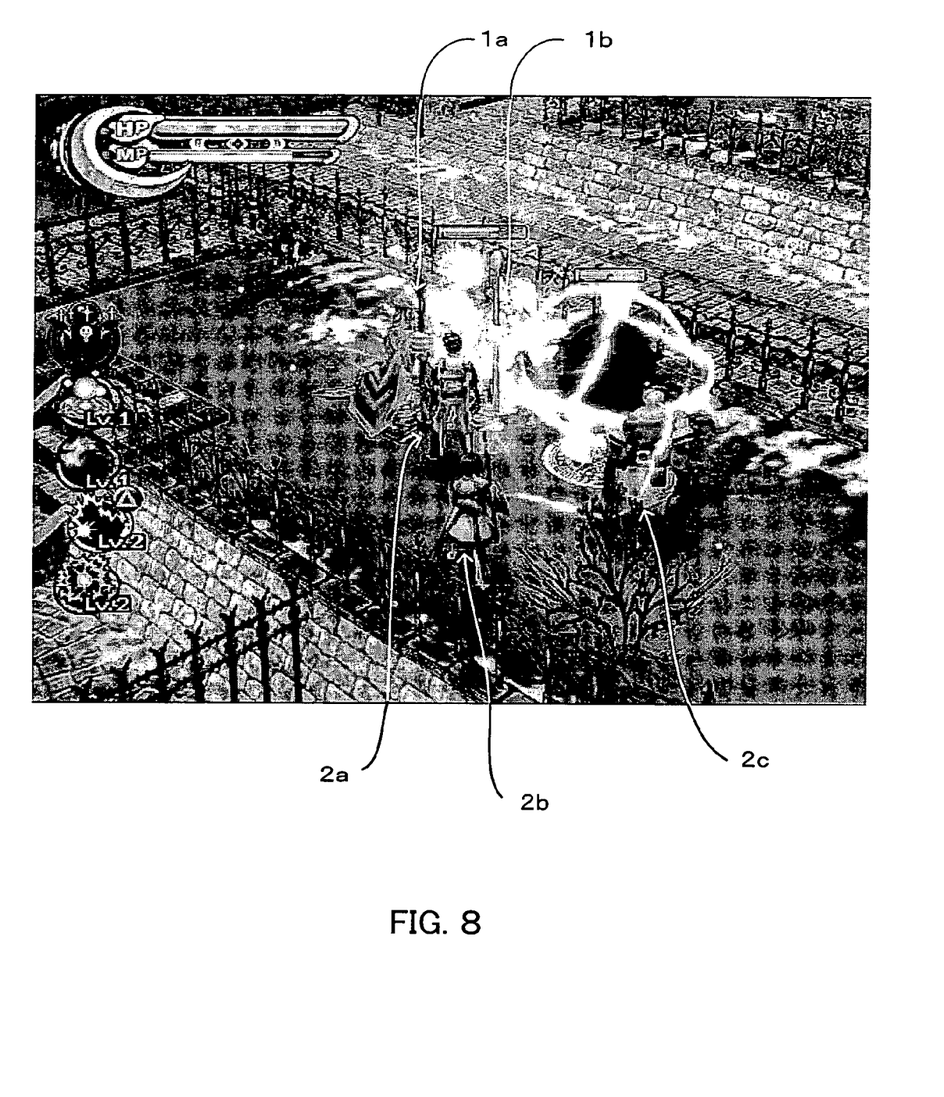
FIG. 8 is a diagram illustrating one example of a game image.

FIG. 8 illustrates one example of a game image to be displayed on the display means of the game apparatus. Characters designated by 1a and 1b in FIG. 8 are opponent characters, a character designated by 2a is a leading character (player character), and characters designated by 2b and 2c are associate characters. FIGS. 9A to 9E are diagrams illustrating display states of "the state of the energy owned by the character", and illustrates examples of the MP gauges showing the quantity of MP (maximum value, current value and the like) owned by the character. The MP gauges are displayed on the game screen by the energy value display processing means 200. The process is explained below with reference to FIGS. 8 and 9.

In the control section 10 (command processing section) of the game apparatus, for example, the menu of various commands is displayed on the monitor so as to prompt the player to input a command. When a command is selected by an operation of an operation button or the like (step S11), a determination is made whether the command instructed for the player character is a special command which consumes EP (step S12). When the command is not the special command, a process corresponding to the instructed normal command is executed (step S13). When the command is the special command, the skill performance judging means 120 in the control section 10 acquires a parameter value representing the EP remaining quantity of the player character from the character information table 2 (step S14), and determines whether the EP remaining quantity is not less than the energy consumption necessary for the performance of the skill instructed by the special command (step S15). When the EP remaining quantity is not less than the energy consumption, the skill performance processing means 130 is called so as to execute the process of the instructed special command (step S16). The energy remaining quantity updating means 150 is called so as to execute the consuming process of the EP remaining quantity (step S17).

Figure 9A:
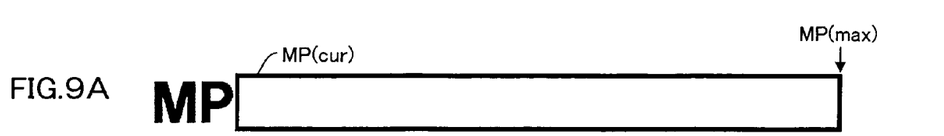
FIGS. 9A to 9E are pattern diagrams illustrating examples of MP gages showing states of an energy owned by a character.
Figure 9B:
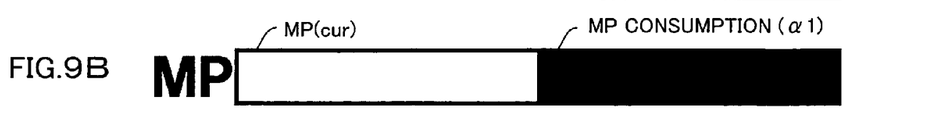

For example, in a state that the current EP (in this embodiment, MP) of the leading character 2a in FIG. 8 is the maximum as shown in FIG. 9A (MP (cur)=MP (max)), the leading character 2a is supposed to use the magic A of the MP consumption α1. In this case, at step S15, when MP (cur)≧α1, the skill performance processing means 130 performs the magic A so as to output an image and a sound effect relating to the magic attack. At step S17, the energy remaining quantity updating means 150 updates the MP remaining quantity to MP (cur)=Mp (cur)–α1 as shown in FIG. 9B.

Figure 9C:
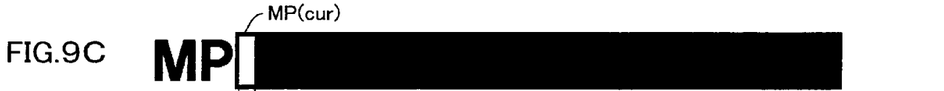
Figure 9D:
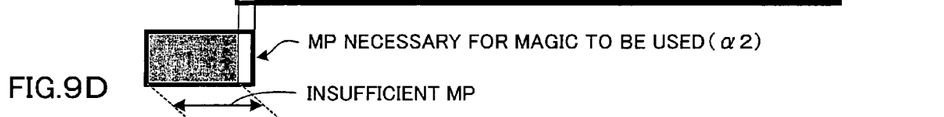
Figure 9E:
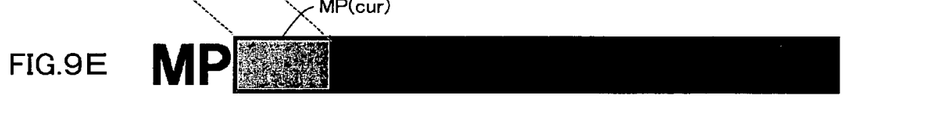

Meanwhile, when the determination is made at step S15 that the EP remaining quantity (in this embodiment, MP (cur) representing the MP remaining quantity) is not the energy consumption or more, the skill performance judging means 120 determines whether the EP remaining quantity exceeds a predetermined basic value (in this embodiment, the basic value="0") (step S18). When the EP remaining quantity is not more than the basic value, the skill performance judging means 120 does not accept the special command (step S19), so as to end the command process. On the other hand, in the case the EP remaining quantity is not the energy consumption or more at step S18, namely, for example as shown in FIGS. 9C and 9D, when MP (cur)<MP consumption α2, if the skill performance judging means 120 determines that the EP remaining quantity (MP (cur)) exceeds the basic value, it accepts the skill performing command as a special case, so as to call the skill performance processing means 130 and allows the means 130 to execute the special command process (S20). The skill performance judging means 120 calls the energy remaining updating means 150 so as to allows the means 150 to execute the consumption process of the EP remaining quantity (EP remaining quantity is a minus energy). For example, in the case where magic with the MP consumption α2 of 7 is used in the state that MP (cur)=1 in FIG. 9C, the energy value is deficient by "6". The energy remaining quantity updating means 150, however, updates the MP remaining quantity such that MP (cur)=MP (cur)–α2=–6. FIG. 9E illustrates a display example of the MP gauge in the state that MP has a minus energy, and when MP (cur) obtains a minus value, the energy value display means 200 displays a bar showing the minus MP remaining quantity on the MP gauge using another color (or pattern) as shown in FIG. 9E (step S21). The load value determining means 140 determines the load value based on the difference between EP and the variable value (step S22). The restriction processing means 170 is called so as to execute the restriction process for placing a restriction on at least one of the abilities, the motion and the action of the character, for example, as the process for placing a restriction according to the load value on the parameter relating to the abilities of the character (step S23), and end the process of the instructed special command.

At step S20, the selection input processing means 190 displays, for example, whether the skill is used on a selection screen or the like so as to ask the player about the use of the skill. Only when the player intends to use the skill, the means 190 may permit the performance of the skill as a special case. That is to say, in the process for determining whether the skill can be performed, when the determination is made that the restriction process is executed by the performance of the skill, for example, options to allow the player to select whether the skills is used and whether another skill is selected are displayed on the display means so that the selection input process for determining whether the skill is performed may be executed based on the player's input.

The EP updating process and the special control mode setting process at steps S17 and S21 are explained below with reference to the flowchart of FIG. 6.

When the EP updating process is the EP consuming process for consuming the energy (step S31), the game control means 100 allows the energy remaining quantity updating means 150 to subtract the EP consumption from the EP remaining quantity (step S32). When the EP remaining quantity transits from a plus value to a minus value, the special control mode setting means 160 sets the control mode to the special control mode (steps S33 and S34), and the restriction processing means 170 is called so as to execute the restriction process for placing a restriction on at least any one of the ability, the motion and the action of the character (step S35). Meanwhile, when EP updating process is not the EP consuming process for consuming the energy at step S31, the determination is made that the EP updating process is the EP restore process, and the energy restoration processing means 151 executes the EP restore process for replenishing the EP remaining quantity with an energy. A main example of the EP restore process is a process for naturally restoring EP at a restore speed $\beta$, but its example includes a process for restore the EP remaining quantity within a range of the EP maximum value when a restore item is used for the character by the player's operation (step S36). Thereafter, the energy restoration processing means 151 determines whether the EP remaining quantity transits from a minus value to a plus value (step S37). When the EP remaining quantity transits to a positive value, the special control mode setting means 160 cancels the normal control mode (step S38), and the restriction processing means 170 is called so as to abort the restriction process (step S39).

With reference to the display example of the MP gauge in FIG. 9, the restriction process at the time of MP restore is explained below. For example, when a restriction is placed such that the restore time of the energy value (MP) is delayed from normal time, MP is restored at a restore speed which is slower than a normal speed until the MP remaining quantity (minus energy value) exceeds the basic value (0) in the state of FIG. 9E. In the display example of FIG. 9E, a length of the left side bar showing the MP insufficient quantity becomes short. At the time when the MP remaining quantity exceeds the basic value (0), the gauge transits to an outline bar (the bar showing the plus MP remaining value), and MP is restored at the normal restore speed until the state of FIG. 9A (the maximum state of MP) is obtained.

Figure 7:
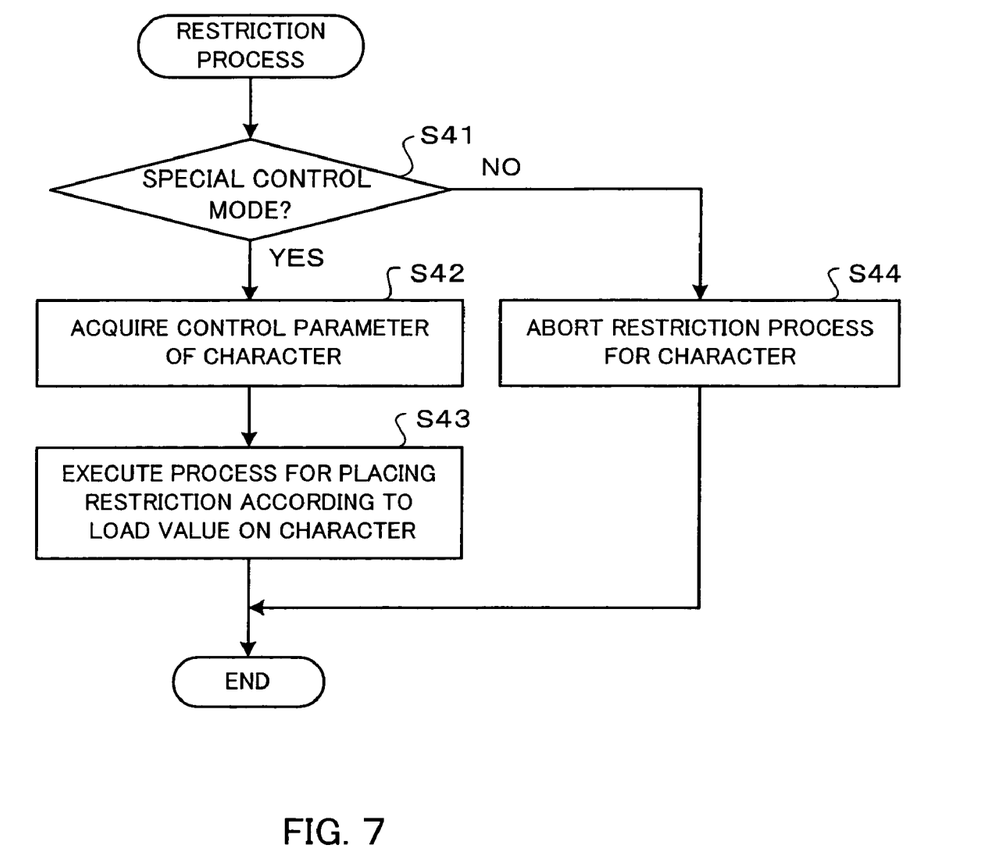
FIG. 7 is a third flowchart illustrating a process relating to special abilities according to the present invention.

The flowchart in FIG. 7 shows the flow of the restriction process at steps S35 and S39. The restriction processing means 170 that places a predetermined restriction on the motion or the like of the character determines whether the control mode of the character is the special control mode (step S41), and when it is the special control mode, the means 170 determines that the character is in the overheat state. The restriction processing means 170 acquires the control parameters (the basic ability parameter 2a, the special ability parameter 2b and the like) of the character from the character information table 2 (step S42). For example, while the overheat state is being generated, the restriction processing means 170 executes the process for placing a restriction according to the load value (in this embodiment, the quantity of a minus energy) on the character. An example of the restriction process is a process for placing a restriction which is disadvantageous in progress of the game on the character (in this embodiment, player character) having a minus energy such as reducing the restore speed of EP and decreasing the defensive power P2. The minus energy quantity may be, for example as shown in FIG. 9E, displayed as a minus gauge with red or the like in the EP (MP) gauge, displayed by blinking at the time around the restore of a plus energy, or displayed as a sound. Namely, the minus energy quantity may be displayed so that the player can understand the overheat state. Since the player can think with his/her head about the overheat state when the player cannot know the state, it is preferable that the over heat state is not displayed as a gauge or a sound (step S43). Meanwhile, when the control mode of the character is not the special control mode at step S41, the determination is made that it is not in the overheat state, and the process for aborting the restriction process on the character (step S44) is executed in such a manner that the restore speed of EP is returned to an original speed or the defensive power P2 is returned to its original state. Thereafter, the process relating to the restriction process in the overheat state is ended.

The above embodiment explains the contents of the character information table in the example of the action type role playing game, but the present invention is not restricted to this kind of game. The present invention may be applied to a game which is conducted on a computer after a character having a skill having a specified effect on an object instead of a skill which consumes the energy is allowed to come out on the game screen. The present invention can be applied to various computer games such as a normal action game, a role playing game, a battle game, a sports game, a race game and a simulation game. The present invention is not restricted to the game apparatus which operates as an independent apparatus, and can be applied also to a network game system where a plurality of players can get plugged-in to an internet, and a game system where a plurality of players take on each other using their individual game apparatuses.

What is claimed is:
1. A computer-usable program for controlling a game stored on a storage medium and configured to cause a computer to operate to implement:
    a game control means for controlling a motion of a character on a game screen according to an operation signal from an operation means operated by a player;
    a skill performance judging means that judges whether the skill performance set for the character was instructed based on an operation signal inputted from the operation means, and when the judgment is made in the affirmative, compares a remaining quantity of energy value at the time of inputting the operation representing a quantity of energy owned by said character with a variable value set as a quantity of energy consumed as an equivalent value for using the skill so as to determine whether the skill can be performed;
    a skill performance processing means that, when said skill can be performed, performs said skill and varies said energy value based on said variable value;
    a counting means counting a real time progress of said game;
    an energy restoration processing means that judges whether the energy value fluctuates from a predetermined value of criterion due to the use of said skill, and when the energy value fluctuates, restores the varied amount of the energy value up to the value of criterion automatically at a predetermined restoration speed according to the real time progress based on the counted value of the real time;
    a special control mode setting means that, when a result of subtraction of said variable value from said remaining quantity of energy value is minus, said remaining quantity of energy value is memorized as a negative remaining value, and when the remaining quantity of energy transits from a plus value to a minus value, a control mode of said character is made as a special control mode;

a first control means that, when said remaining quantity of energy value is positive and less than said variable value at the time that an operation for instructing said skill performance is proceeded, said skill is performed by said skill performance processing means and a process according to said special control mode setting means is implemented, while when said remaining quantity of energy value is negative and it is already in the special control mode, a performance command of said skill is not accepted;

a restriction processing means for proceeding with a second control that, when it is in said special control mode, a restoration speed of said energy value in said energy restoration processing means is made as slower than in a normal speed;

an energy value display means displaying a gauge image showing a fluctuated condition of said energy value on said game screen; and a normal control mode setting means for proceeding that when the remaining value is restored from a minus value to a basic value, the first and the second controls of the character by the special control mode are terminated.

2. The computer-usable program for controlling a game according to claim 1, for making a computer operate as a selection input processing means that, when said skill performance judging means judges that said remaining quantity of energy value is less than said variable value at the time that an operation for instructing said skill performance is proceeded, displays options to use or not use said skill or to select or not select another skill on a display means in order to make a player select an option, and determines whether said skill is performed based on the option selected by the player's input.

3. A storage medium that stores the computer-usable program for controlling a game according to claim 1 therein and can be read by a computer.

4. A computer-usable program for controlling a game according to claim 1 further configured to cause a computer to operate to implement a load value determining means determining a load value based on a difference between said remaining quantity of energy value and said variable value, and said restriction means comprises restricting a motion of the character on the game screen as a process for placing a restriction corresponding to said load value on a parameter relating to an ability of said character.

5. A computer-usable program for controlling a game according to claim 1, wherein said restriction processing means controls said restoration speed to change according to the amount of said remaining minus value during said special control mode.

6. A computer-usable program for controlling a game according to claim 1, wherein said restriction processing means restricts the use of item for restoring said energy value during said special control mode.

7. A game apparatus, comprising:
a game control means for controlling a motion of a character on a game screen according to an operation signal from an operation means operated by a player;
a skill performance judging means that judges whether the skill performance set for the character was instructed based on the operation signal, and when the judgment is made in the affirmative, compares a remaining quantity of energy value at the time of inputting the operation representing a quantity of energy owned by said character with a variable value set as a quantity of energy consumed as an equivalent value for using the skill so as to determine whether the skill can be performed;

a skill performance processing means that, when said skill can be performed, performs said skill and varies said energy value based on said variable value;

a counting means counting a real time progress of said game;

an energy restoration processing means that judges whether the energy value fluctuates from a predetermined value of criterion due to the use of said skill, and when the energy value fluctuates, restores the varied amount of the energy value up to the value of criterion automatically at a predetermined restoration speed according to the real time progress based on the counted value of the real time;

a special control mode setting means that, when a result of subtraction of said variable value from said remaining quantity of energy value is minus, said remaining quantity of energy value is memorized as a negative remaining value, and when the remaining quantity of energy transits from a plus value to a minus value, a control mode of said character is made as a special control mode;

a control means that, when said remaining quantity of energy value is positive and less than said variable value at the time that an operation for instructing said skill performance is proceeded, said skill is performed by said skill performance processing means and a process according to said special control mode setting means is implemented, while when said remaining quantity of energy value is negative and it is already in the special control mode, a performance command of said skill is not accepted;

a restriction processing means that, when it is in said special control mode, a restoration speed of said energy value in said energy restoration processing means is made as slower than in a normal speed;

an energy value display means displaying a gauge image showing a fluctuated condition of said energy value on said game screen; and a normal control mode setting means for proceeding that when the remaining value is restored from a minus value to a basic value, the first and the second controls of the character by the special control mode are terminated.

8. A game apparatus according to claim 7, further comprising a load value determining means determining a load value based on a difference between said remaining quantity of energy value and said variable value, and said restriction means comprises restricting a motion of the character on the game screen as a process for placing a restriction corresponding to said load value on a parameter relating to an ability of said character.

9. A game apparatus according to claim 7, characterized in that said restriction processing means controls said restoration speed to change according to the amount of said remaining minus value during said special control mode.

10. A game apparatus according to claim 7, characterized in that said restriction processing means restricts the use of item for restoring said energy value during said special control mode.

* * * * *